April 15, 1930.   J. A. CAMPBELL   1,754,607
SCRUBBER
Filed Nov. 5, 1928    2 Sheets-Sheet 2

Inventor
Julian A. Campbell.

Attorney.

Patented Apr. 15, 1930

1,754,607

UNITED STATES PATENT OFFICE

JULIAN A. CAMPBELL, OF LONG BEACH, CALIFORNIA

SCRUBBER

Application filed November 5, 1928. Serial No. 317,346.

The present invention relates generally to vapor or gas purifiers and scrubbers, and is more particularly concerned with apparatus for removing impurities such as crude oil, finely divided solids, water or the like, from natural gas.

In the operation of gasoline absorption plants, it is desirable that the gas, before passing through the absorbers, be freed from foreign materials as completely as possible in order to prevent contamination of the absorption oil. It is a common occurrence, however, that difficulties in plant operation are experienced due to the presence of crude oil mist in the natural gas; especially is this the case in fields wherein there is a large flush production, and in which the traps in the gas lines become overloaded. In some fields, this mist content amounts to a considerable quantity of crude oil which, in passing into the absorber with the gas, becomes mixed with the absorption oil, and upon subsequent distillation of the absorption oil gives up only its comparatively light fractions in the distillation process.

Thus the asphalt content of the absorption oil is continually increased, with the effect that the absorptive qualities of the oil are correspondingly impaired. In addition, the asphaltic bodies have a further deleterious action on the absorption oil in that they raise its viscosity, lower its thermal conductivity causing low heat transfer in the interchangers and coolers, and also in that they have a tendency to deposit in the form of an asphaltic scum in the tubes of the heating and cooling apparatus.

Although various devices are in use for effecting the elimination of the crude oil mists, these devices being commonly termed mist extractors, centrifugal separators, and numerous other devices which depend for operation upon the principle of throwing out the entrained liquid particles by virtue of rapid changes in the direction of flow of the gas, these various devices, while eliminating a certain amount of the mist, are comparatively ineffective in completely separating this objectionable agent of contamination.

It has been observed further that in certain fields the gas carries a certain amount of foreign matter such as finely divided oxide, silica and other materials almost colloidal in nature which are identified as particles of rotary mud. Inasmuch as the gas in almost all instances carries with it a certain amount of moisture, these solid particles act effectively as agents in effecting the formation of emulsions between the absorption oil and the gas carried moisture. It is essential therefore, that a form of apparatus be provided that is effective not only in removing the crude oil mist, but which in addition, is equally effective in removing the solid materials and emulsified water.

Accordingly, by means of the present invention, I have provided apparatus by which the natural gas may be freed completely of foreign substances before passing to the main plant absorbers, thereby insuring highly efficient operation by proper conditioning of the absorption oil. In accomplishing these results I subject the gas to what may be considered preliminary selective absorption, that is, a preliminary absorption stage in which substantially nothing but the foreign materials mentioned above are removed from the gas. As will be seen later, the apparatus is adapted to operate continuously in purifying the natural gas stream prior to its further treatment in the absorption plant.

Additional features and advantages of the invention will be made apparent in the following detailed description of a typical embodiment thereof, reference being had throughout the description to the accompanying drawings in which.

It will be understood that although I have shown the invention as applied to a scrubber, certain general characteristics of the device may be employed to advantage in other types of equipment concerned with the treatment of gases or liquids by more or less intimate exposure of one to the other, and therefore the invention, in its broader aspects, is not to be considered or limited specifically to the present disclosure.

Figure 1:
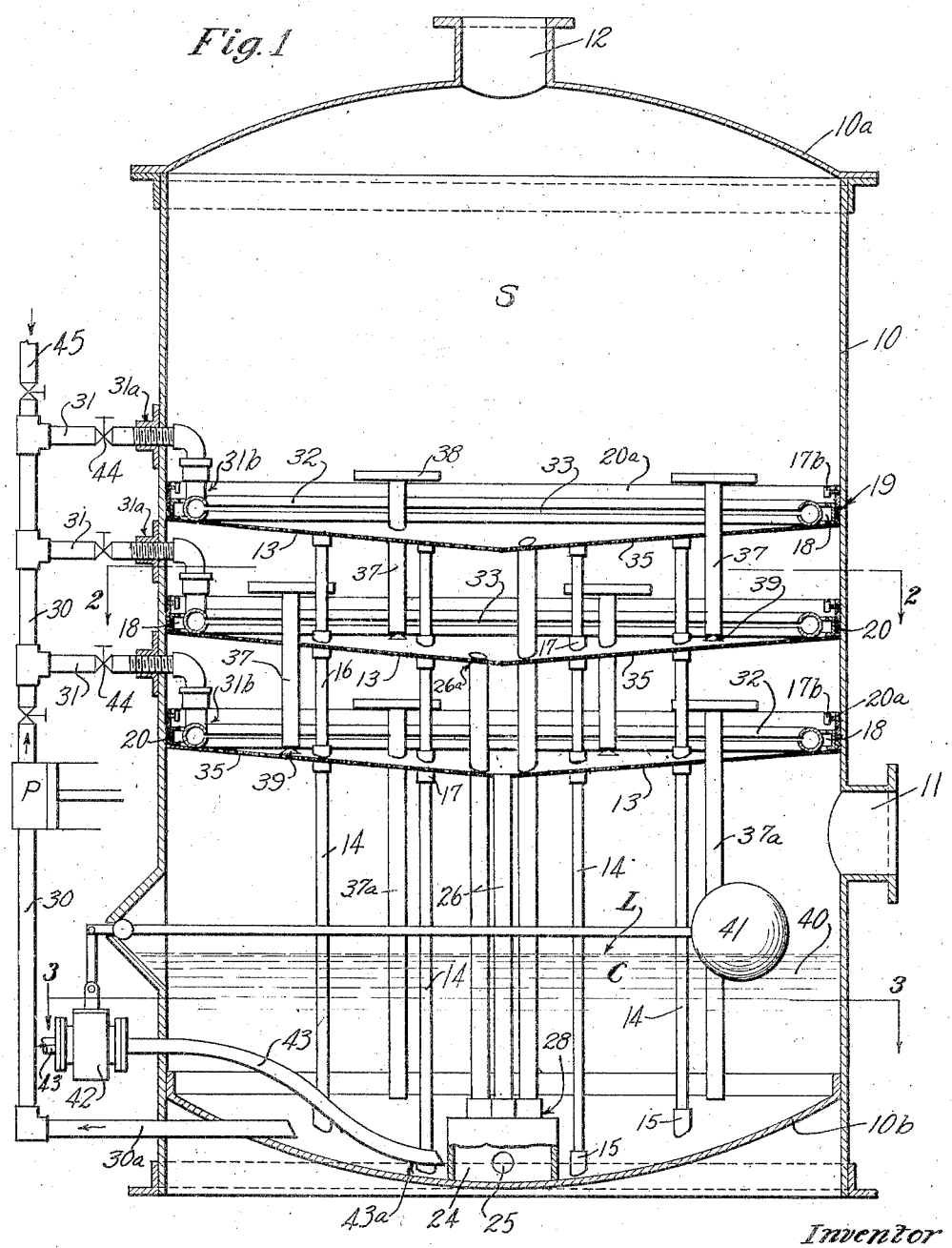
Fig. 1 is a vertical section through the scrubber.
Figure 2:
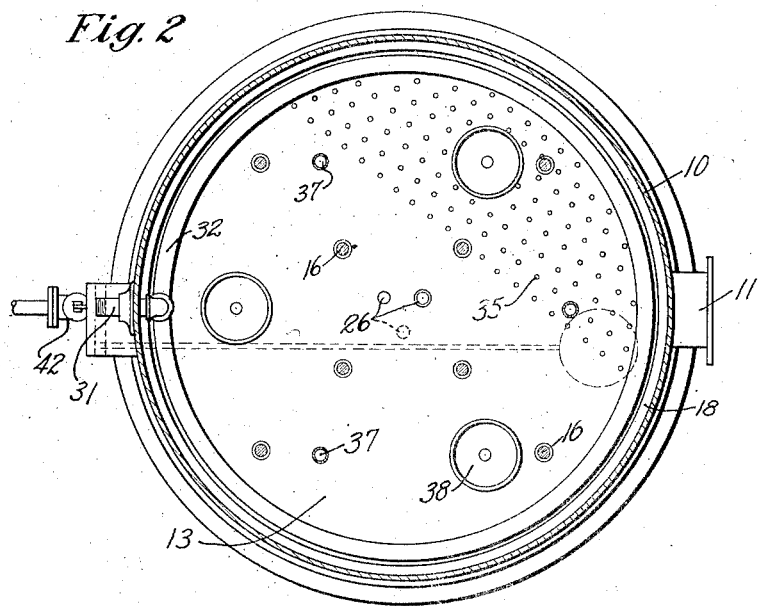
Fig. 2 is a reduced horizontal section on line 2—2 of Fig. 1.
Figure 3:
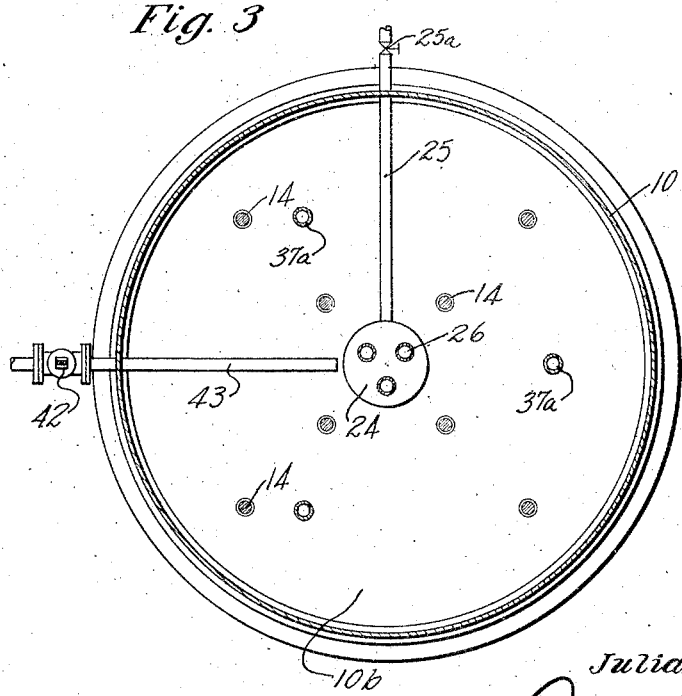
Fig. 3 is a correspondingly reduced section on line 3—3 of Fig. 1.

Referring first to Fig. 1, the scrubber is seen to embody a vertical cylindrical shell 10 having top and bottom closures 10ª and 10ᵇ, respectively, the shell preferably being of relatively large diameter, in order to have capacity for handling large volumes of gas. Gas is introduced to the shell through the inlet 11 and after treatment as hereinafter described, flows from the shell through outlet 12 in the top closure 10ª.

Within the shell is a plurality of vertically spaced apertured decks or plates 13, of which there may be any suitable number, three being shown as typical. Although it is within the scope of the invention, as set forth in the claims, to form the members 13 of any suitable construction such as will allow the upward flow of vapors or gases therethrough and yet hold the liquid through which the gases are to be passed, I prefer to construct these members of perforated sheet metal plates. The plates are shaped in the form of inverted cones, having their apices at or near the axis of the shell, the slope of the plates preferably being such as to enable emulsified liquid bodies later described, to flow radially inward to the apices of the plates. Although the plates may be supported by any suitable means, I have provided as a typical means, vertical supporting rods 14 threaded in collars 15 in bottom closure 10ᵇ, and having upper spacer segments 16 threaded in collars 17 carried in the plates. Annular channel iron rims 18 are welded on the upper surfaces of the plates and are spaced as at 19 from shell 10. The joint between each plate and the shell is made substantially liquid tight by means of suitable packing 20 placed in space 19. The packing is held in place by the use of packing rings 20ª positioned by screws 17ᵇ in the rings and set up against the shell.

In the bottom of the shell I have provided a chamber 24, separate from the float chamber C, and communicating with the exterior of the shell through line 25. A plurality of vertical discharge lines 26 extend at their upper ends through one each of each plate 13, and open at their lower ends, at 28, into chamber 24. Lines 26 extend through the plates substantially at their apices, and, for purposes later described, serve to conduct liquid from each of the plates to chamber 24, from which it is discharged out of the scrubber through line 25. Plates 13 may be formed so that their apices are relatively offset in order that the vertical lines 26 may open thereto directly at the apices, or, due to the relatively gradual slope of the sides of the plate the apices may be vertically alined and the discharge lines offset with relation thereto.

Comparatively light or absorption liquid from header 30 is delivered on each of plates 13 through branch lines 31 extending through the shell as at 31ª. The branch lines each terminate at 31ᵇ in an annular or ring pipe 32 extending on the outer portion of each plate and having an opening 33 through its inner periphery, this opening being in the form of a narrow or more or less restricted slot extending continuously around the pipe. Thus it is seen that the liquid being discharged on the outer extent of each plate tends, by virtue of the conical shape of the plate, to flow more or less radially inward thereon.

The gas introduced to the shell through inlet 11 tends, upon flowing upward through the plate by way of perforations 35, not only to bubble upward through the liquid contained on each plate, but to cause this liquid to build up into a mass of froth to such an extent that there is but comparatively little unfrothed liquid thereon. Substantially the same action occurring in the present device as regards the building up of a froth body, is fully discussed in my co-pending application on "method of absorption," Serial No. 184,870, filed April 19, 1927.

Extending through each of the plates is a suitable number of liquid discharge tubes 37, three for each plate being shown as typical, the upper ends of these tubes in each plate preferably being in the same horizontal plane, and the lower ends of the tubes carried in the two upper plates terminating more or less closely to the tops of the plates below. A froth breaking pan 38 is mounted on the upper end of each delivery tube, the pan preferably being relatively shallow and having sharp upper edges for purposes that will later be made apparent. A spreader cone 39 is mounted on the lower end of each delivery tube 37, except those of the lowermost plates, the purpose of these cones being to spread the liquid flowing downward through the tube, over a large surface of the froth plate below. Although the lower end of the lowermost discharge tubes 28 may be provided with any suitable form of liquid seal cup, preferably they are permitted to extend below the liquid level in the float chamber C, thus preventing the flow of gas upward through these tubes. It may be noted that the plate and delivery tube structure in the present scrubber has certain general characteristics similar to the absorber structure described in the Patent No. 1,654,785 issued to me January 3rd, 1928, on absorbers. The liquid body 40, delivered to the float chamber C through lines 37ª, is maintained at constant level L in the chamber by means of float 41 in conjunction with the float controlled and balanced valve 42 in outlet line 43, the latter preferably extending as at 43ª from a point near the bottom of the float chamber.

Although it is to be understood that the absorption liquid may be supplied to any one or all the plates through line 31 by regulating valves 44, I will describe the operation of the invention assuming that such liquid is delivered only to the uppermost plate. The liquid discharged through slot 33 tends to flow radially inward on the plate and to spread more or less thinly thereupon. Due to the upward flow of gas through the perforations, the absorption liquid is changed practically entirely to a body of froth, this liquid being prevented from flowing through the plates by way of perforations 35 on account of the gas pressure. The body of froth above each plate is built up to the edge level of pan 38, and froth bubbles tending to flow into the pan, come into contact with the sharp upper edges thereof and become broken. The liquid collected in the pan flows downward through pipe 37 to the plate below, the liberated vapor then flowing upwardly. Because of the continuous breaking of the froth bubbles above the uppermost plate a considerable space S, preferably is provided in the upper portion of the shell in order that entrained liquid particles carried above that plate by the gases, may be caused to drop back onto the plate before reaching the outlet 12.

As previously stated, the gas flowing into the scrubber through inlet 11 contains among other possible impurities, crude oil mist, solid particles, and a certain amount of moisture. When the gas is brought into intimate contact with the absorption oil on each plate as described, the crude oil mist immediately becomes held or carried in solution in the absorption oil. Due to the effect had by the solid particles, as previously mentioned, in aiding the formation of an emulsion between the gas carried liquid and the absorption oil, substantially complete removal of liquid from the feed gas is effected, which liquid appears as emulsified globules at the bottom of each froth body and on each plate. Inasmuch as the surfaces of plates 13 are oily, the emulsions formed thereupon tend to slide down and into discharge tubes 26ª and thence into the chamber 24. Sufficient pressure is maintained in the scrubber during operation that the continuous discharge from chamber 24 through line 25 may be maintained by adjusting valve 25ª connecting the chamber with the atmosphere. The solid particles may either settle out to chamber 24 along with the water and become discharged through line 25, or they may, to a certain extent, be held in the absorption oil.

Should the plates become dirty, they can readily be flushed either with water or hot oil in line 45 by proper adjustment of the valves in header 30 and branch lines 31. The same type of liquid used in the main plant absorbers, may satisfactorily serve as the circulating medium in the present scrubber. This liquid, of course, soon absorbs a considerable amount of gasoline, but soon reaches a degree of saturation which will permit the gasoline fractions to flow through the highly saturated liquid without being absorbed. In order to effect continuous circulation of the absorbing liquid the discharge line 30ª communicates with header 30 and thus the liquid in body 40 is continuously forced by pump P through the upper ring pipe 32 on the uppermost plate, or also through any or all of the other plates should it be so desired. Should an excessive amount of liquid be taken into the scrubber so as to abnormally raise the liquid level L, the balanced valve 42 opens when the float rises and permits the discharge of excess liquid through line 43.

As a general summary of the operation of the invention it will be seen that whereas gas containing comparatively heavy liquid particles and other impurities are introduced beneath the plates and comparatively light liquid is delivered on top the plates, said light liquid and gas are brought into such intimate content that the heavy liquid particles and gas become held in the light liquid body. In addition, I have provided means not only for separating the heavy and light liquid, but also for separately removing the heavy liquid from the system.

It will be understood the drawings and description are to be considered merely as illustrative of and not restrictive on the broader claims appended hereto, for various changes in design, structure and arrangement may be made without departing from the spirit and scope of said claims.

I claim:

1. A device of the character described embodying a vertical shell, a horizontally extending perforated plate within the shell, a liquid inlet for delivering comparatively light liquid on top said plate, a gas inlet for introducing gas containing comparatively heavy liquid particles beneath the plate, the gas body flowing upward through the plate perforations and the heavy liquid particles being held in the light liquid on said plate, means associated with said plate for separately removing the liquid, and means for conducting said light liquid downward through the plate.

2. A device of the character described embodying a vertical shell, a plurality of vertically spaced and horizontally extending apertured plates in the shell, a liquid inlet for delivering comparatively light liquid on top the uppermost plate, means for delivering said light liquid downward and successively over each plate, a gas inlet for introducing gas containing comparatively heavy liquid particles beneath the lowermost plate, the gas flowing upward through the plate apertures and the heavy liquid particles being held in the light liquid on each plate, and means associated with each plate for separately removing said heavy fluid.

3. A device of the character described embodying a vertical shell, a plurality of vertically spaced and horizontally extending apertured plates in the shell, a liquid inlet for delivering comparatively light liquid on top the uppermost plate, means for delivering said light liquid downward and successively over each pate, a gas inlet for introducing gas containing comparatively heavy liquid particles beneath the lowermost plate, the gas flowing upward through the plate apertures and the heavy liquid particles emulsifying with the liquid on each plate and settling to the bottom thereof, and means for drawing off the settled heavy liquid through the bottom of each plate.

4. In a device of the character described, a vertical shell, a plurality of vertically spaced and inverted conical perforated plates in the shell, a liquid inlet for delivering comparatively light liquid on top the uppermost plate, means for delivering said light liquid downward and successively over each plate, a gas inlet for introducing gas containing comparatively heavy liquid particles beneath the lowermost plate, the gas body flowing upward through the plate perforations and the heavy liquid particles being held in and settling to the bottom of the light liquid on each plate, and means for drawing off the settled liquid from the apex of each plate.

5. In a device of the character described, a vertical shell, a plurality of vertically spaced and inverted conical perforated plates in the shell, said plates having relatively offset apices, a liquid inlet for delivering comparatively light liquid on top the uppermost plate, means for delivering said light liquid downward and successively over each plate, a gas inlet for introducing gas containing comparatively heavy liquid particles beneath the lowermost plate, the gas body flowing upward through the plate perforations and the heavy liquid particles being held in and settling to the bottom of the light liquid on each plate, a chamber in said shell below the lowermost plate and communicating with the shell exterior, and a plurality of liquid delivery pipes extending one each from the apex of each plate to said chamber.

6. In a device of the character described, a vertical shell, a plurality of vertically spaced and inverted conical perforated plates in the shell, a liquid inlet embodying an annular pipe extending on the outermost extent of the uppermost plate and having an opening through its inner periphery, comparatively light liquid being discharged through said opening on said uppermost plate, means for delivering said light liquid downward and successively over each plate, a gas inlet for introducing gas containing comparatively heavy liquid particles beneath the lowermost plate, the gas body flowing upward through the plate perforations and the heavy liquid particles being held in and settling to the bottom of the light liquid on each plate, and means for drawing off the settled liquid from the apex of each plate.

7. In a device of the character described, a vertical shell, a plurality of vertically spaced and inverted conical perforated plates in the shell, liquid inlets embodying a plurality of annular pipes extending one each on the outer portion of each plate and each pipe having an annular slot in its inner periphery, comparatively light liquid being discharged on the plate through said slots, means for delivering said light liquid downward and successively over each plate, a gas inlet for introducing gas containing comparatively heavy liquid particles beneath the lowermost plate, the gas body flowing upward through the plate perforations and the heavy liquid particles being held in and settling to the bottom of the light liquid on each plate, and means for drawing off the settled liquid from the apex of each plate.

8. A device of the character described embodying a vertical shell, a plurality of vertically spaced and inverted conical perforated plates in the shell, means for delivering liquid on top the uppermost plate, a gas inlet for introducing gas below the lowermost plate, froth breaking means arranged above said plate and equipped with liquid delivery means to deliver liquid to a point above the plates below, and means for drawing off liquid from substantially the apex of each plate.

9. A device of the character described embodying a vertical shell, a plurality of vertically spaced and inverted conical perforated plates in the shell, means for delivering liquid on top the uppermost plate, a gas inlet for introducing gas below the lowermost plate, froth breaking pans arranged above said plates, liquid delivery tubes extending downward from the froth breaking pans of each plate to deliver liquid from the pans to the plate below, a chamber in said shell below the lowermost plate and communicating with the shell exterior, and a plurality of liquid delivery pipes extending one each from substantially the apex of each plate to said chamber.

10. A device of the character described embodying a vertical shell, a plurality of vertically spaced and inverted conical plates in the shell, froth breaking pans arranged above each plate, liquid delivery tubes extending downward from the froth breaking pans of each plate to deliver liquid from the pans to the plate below, a chamber in said shell below the lowermost plate and communicating with the shell exterior, a plurality of liquid delivery pipes extending one each from the apex of each plate to said chamber, a gas inlet for introducing gas below the lowermost plate, a liquid inlet embodying an annular pipe on the upper plate and extending on the outer portion thereof, said annular pipe having an annular slot in its inner periphery through which feed liquid is adapted to be discharged, and a plurality of liquid delivery pipes extending one each from substantially the apex of each plate to said chamber.

In witness that I claim the foregoing I have hereunto subscribed my name this 27 day of September, 1928.

JULIAN A. CAMPBELL.